(12) United States Patent
Arimatsu et al.

(10) Patent No.: US 6,414,711 B2
(45) Date of Patent: *Jul. 2, 2002

(54) APPARATUS FOR CORRECTING MOVEMENT PATH OF A ROBOT AND A METHOD THEREFOR

(75) Inventors: Taro Arimatsu; Kazuhiko Akiyama, both of Yamanashi (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,059

(22) PCT Filed: Sep. 6, 1996

(86) PCT No.: PCT/JP96/02548

§ 371 (c)(1),
(2), (4) Date: Apr. 29, 1997

(30) Foreign Application Priority Data

Sep. 6, 1995 (JP) ............................................. 7-228716

(51) Int. Cl.[7] .............................. H04N 7/18; H04N 9/47
(52) U.S. Cl. .......................... 348/86; 348/90; 348/130
(58) Field of Search ............................ 348/86, 87, 88, 348/90, 94, 135, 152, 153, 154, 91, 92, 125, 129, 130; 356/394; 382/41, 106, 8; 364/513; 395/94; 318/568.13, 568.11; 901/47, 3; H04N 7/18, 9/47

(56) References Cited

U.S. PATENT DOCUMENTS

| | | | | |
|---|---|---|---|---|
| 4,613,942 A | * | 9/1986 | Chen ........................... 364/513 |
| 4,675,502 A | * | 6/1987 | Haefner et al. ......... 219/124.34 |
| 4,731,860 A | * | 3/1988 | Wahl ............................ 382/41 |
| 4,803,735 A | * | 2/1989 | Nishida et al. ................. 382/8 |
| 4,985,846 A | * | 1/1991 | Fallon ......................... 364/513 |
| 5,066,902 A | * | 11/1991 | Watanabe .............. 318/568.16 |
| 5,115,403 A | * | 5/1992 | Yoneda et al. ............... 382/152 |
| 5,255,199 A |   | 10/1993 | Barkman et al. |
| 5,300,868 A | * | 4/1994 | Waranabe et al. ...... 318/568.13 |
| 5,319,443 A | * | 6/1994 | Watanabe et al. ........... 356/375 |
| 5,327,058 A | * | 7/1994 | Rembutsu .............. 318/568.11 |
| 5,380,978 A | * | 1/1995 | Pryor .................... 219/121.64 |
| 5,408,409 A | * | 4/1995 | Glassman et al. ...... 364/413.13 |
| 5,440,650 A | * | 8/1995 | Hieda et al. ................. 356/394 |
| 5,452,370 A | * | 9/1995 | Nagata ........................ 382/153 |
| 5,481,298 A | * | 1/1996 | Sasaki et al. ............... 348/135 |
| 5,572,102 A | * | 11/1996 | Goodfellow et al. ... 318/568.13 |
| 5,572,103 A | * | 11/1996 | Terada ................... 318/568.13 |
| 5,577,130 A | * | 11/1996 | Wu ............................. 382/106 |
| 5,579,444 A | * | 11/1996 | Dalziel et al. ................ 395/94 |
| 5,959,425 A | * | 9/1999 | Bieman et al. ........ 318/568.15 |
| 5,987,591 A | * | 11/1999 | Jyumonji ..................... 712/93 |

FOREIGN PATENT DOCUMENTS

| | | |
|---|---|---|
| EP | 0 062 683 | 10/1982 |
| EP | 0 188 626 | 7/1986 |
| EP | 0 520 396 | 12/1992 |
| JP | 59-180605 | 10/1984 |
| JP | 61-173878 | 8/1986 |
| JP | 5-108123 | 4/1993 |
| JP | 5-200654 | 8/1993 |
| JP | 6-143166 | 5/1994 |
| JP | 7-55427 | 3/1995 |
| JP | 7-84631 | 3/1995 |

OTHER PUBLICATIONS

Patent Abstracts of Japan, vol. 010, No. 048 (Feb. 25, 1986).

* cited by examiner

*Primary Examiner*—Vu Le
*Assistant Examiner*—Tung Vo
(74) *Attorney, Agent, or Firm*—Staas & Hasley, LLP

(57) ABSTRACT

A tool mounted on the wrist end of a robot is placed in a predetermined photographing position, and the front and side faces of the tool are photographed by cameras to obtain three-dimensional shape data of the tool. The extent of deformation of the tool is detected by comparing the obtained shape data and reference shape data, and a programmed movement path for the robot is corrected depending on the extent of deformation.

8 Claims, 6 Drawing Sheets

APPARATUS FOR CORRECTING MOVEMENT PATH OF A ROBOT AND A METHOD THEREFOR

BACKGROUND OF THE INVENTION

1. Field of the Invention

The present invention relates to an apparatus and a method for automatically correcting deviation from a taught path due to deformation of a tool mounted on the wrist end of a robot during an operation by the robot.

2. Background of the Related Art

In general, a tool that is mounted on a wrist end of a robot for arc welding and sealing has an ellongated shape, and is more apt to be bent, even by a light impact, than tools for spot welding and handling. If programs for the robot are executed with the tool bent, naturally, the welding or sealing cannot be effected along a taught path.

Conventionally, if the tool is bent during operation, it is replaced in its entirety or corrected to a possible extent, and errors resulting from insufficient correction are adjusted by correcting a programmed path corresponding to the degree of error.

In order to carry out such repairing operation, however, the working line must be stopped for a long time, and the adjustment requires much time and labor, so that the manufacturing efficiency is lowered.

Moreover, the operation is performed along a wrong path without the attendance of an operator, so that defective products may possibly be manufactured.

SUMMARY OF THE INVENTION

The object of the present invention is to provide a tool shape correcting method and apparatus for a robot, in which the shape of a tool mounted on the wrist end of the robot is recognized before starting operation by the robot, whereby the deviation from a taught path attributable to deformation of the tool, if any, can be corrected automatically.

In order to achieve the above object, according to the present invention, a tool mounted on the wrist end of a robot and a camera for photographing the tool are first located in predetermined relative positions, images picked up by the camera are then returned and processed, shape data of the tool is obtained from the processed image data, the extent of deformation of the tool is detected by comparing the obtained tool shape data with reference tool shape data, and a taught path for the robot is corrected in accordance with the extent of the deformation.

According to the present invention, having the features described above, the extent of deformation of the the tool is detected before the operation by the robot is executed, and the taught path can be automatically corrected depending on the extent of the deformation, so that accurate operation can be performed even if there is some deformation of the tool.

DESCRIPTION OF THE PREFERRED EMBODIMENT

Figure 1:
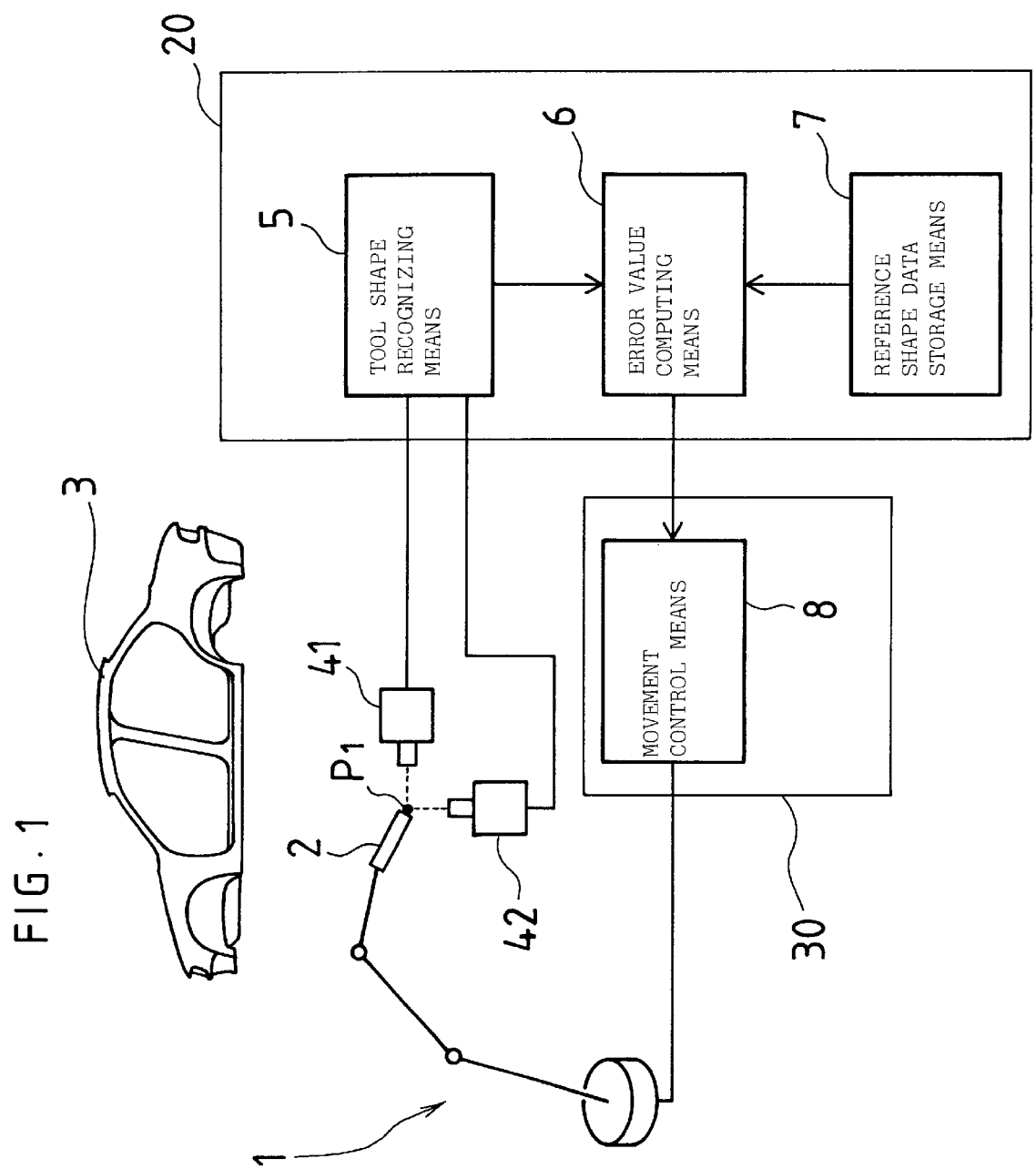
FIG. 1 is a block diagram schematically illustrating an apparatus, according to the present invention, for detecting deformation of a tool and correcting a program-taught path in accordance with the extent of the deformation.

Referring first to FIG. 1, an outline of an apparatus for detecting deformation of a tool and correcting a program-taught path in accordance with the extent of the deformation will be described.

A robot 1 is fitted with the tool 2 on its arm end. The tool 2 carries out an operation (hereinaftter referred to as main operation) such as arc welding for a workpiece 3 (e.g., vehicle body frame). The robot 1 is controlled by means of a robot control apparatus 30.

Before the main operation is started, the tool 2 is moved to a predetermined photographing position P1 by the robot control apparatus 30. As a result, the tool 2 is instructed to take a predetermined posture by which its tool center point is in alignment with the position P1. Two cameras 41 and 42 photograph the tool in the predetermined position P1 and the predetermined posture. One camera 41 photographs the front face of the tool 2, while the other camera 42 photographs a side face of the tool 2.

These cameras 41 and 42 photograph the shape of the tool 2 in response to a command from an image processing apparatus 20. This image processing apparatus 20 comprises tool shape recognizing means 5, error value computing means 6, and reference shape data storage means 7. The tool shape recognizing means 5 recognizes the shape of the tool 2 referring to the images picked up by the cameras 4. The error value computing means 6 compares the current tool shape recognized by the tool shape recognizing means 5 and the reference shape data previously stored in the reference shape data storage means 7, and computes a deviation (error value or extent of deformation of the tool) of the current tool shape from the reference shape data.

The error value computed by the error value computing means 6 is fed to movement control means 8 in the robot control apparatus 30. On the other hand, the movemeant control means 8 corrects the programmed path in accordance with the error value data fed from the error value computing means 6, and, in the main operation, controls the movement of the robot 1 according to the corrected path.

Figure 2:
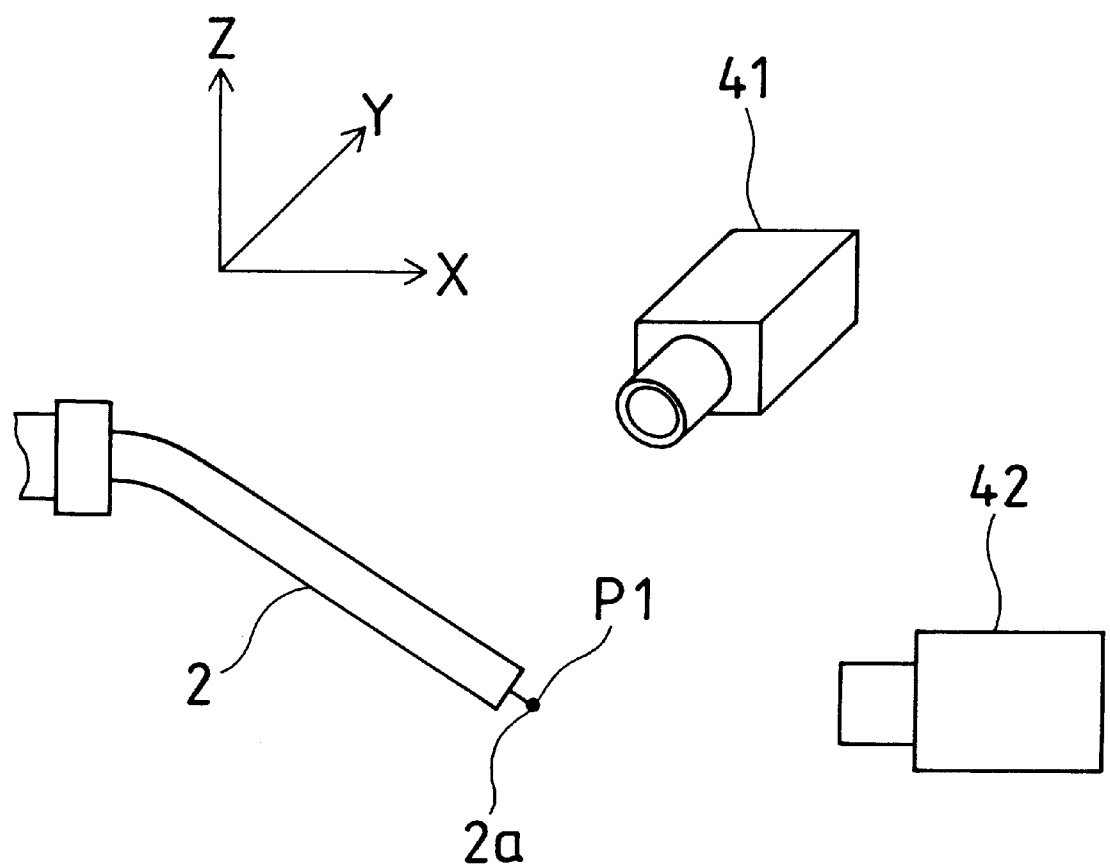
FIG. 2 is a diagram for illustrating positional relations among the tool in a predetermined photographing position and cameras.

Referring further to FIG. 2, positional relations among the tool 2 and the cameras 41 and 42 in FIG. 1 will be described.

The two cameras 41 and 42 are set in the vicinity of they predetermined photographing position P1, and the both face photographing position P1. The direction in which the one camera 41 faces the photographing position P1 is perpendicular to the direction in which the other camera 42 faces the photographing position P1. If a machine coordinate system having three rectangular axes (X-, Y- and Z-axes) is set in the manner shown in FIG. 2, the one camera 41 is located so that its optical axis extends parallel to the Y-axis, and picks up an image of the front face of the object of photographing (tool 2), that is, an XZ-plane image, while the other camera 42 is located so that its optical axis extends parallel to the X-axis, and picks up an image of the side face of the object of photographing, that is, a YZ-plane image. Thus, image data in two directions are obtained for the object of photographing (tool 2) by means of the two cameras 41 and 42, so that three-dimensional data for the object of photographing can be obtained by synthesizing those image data.

Figure 3:
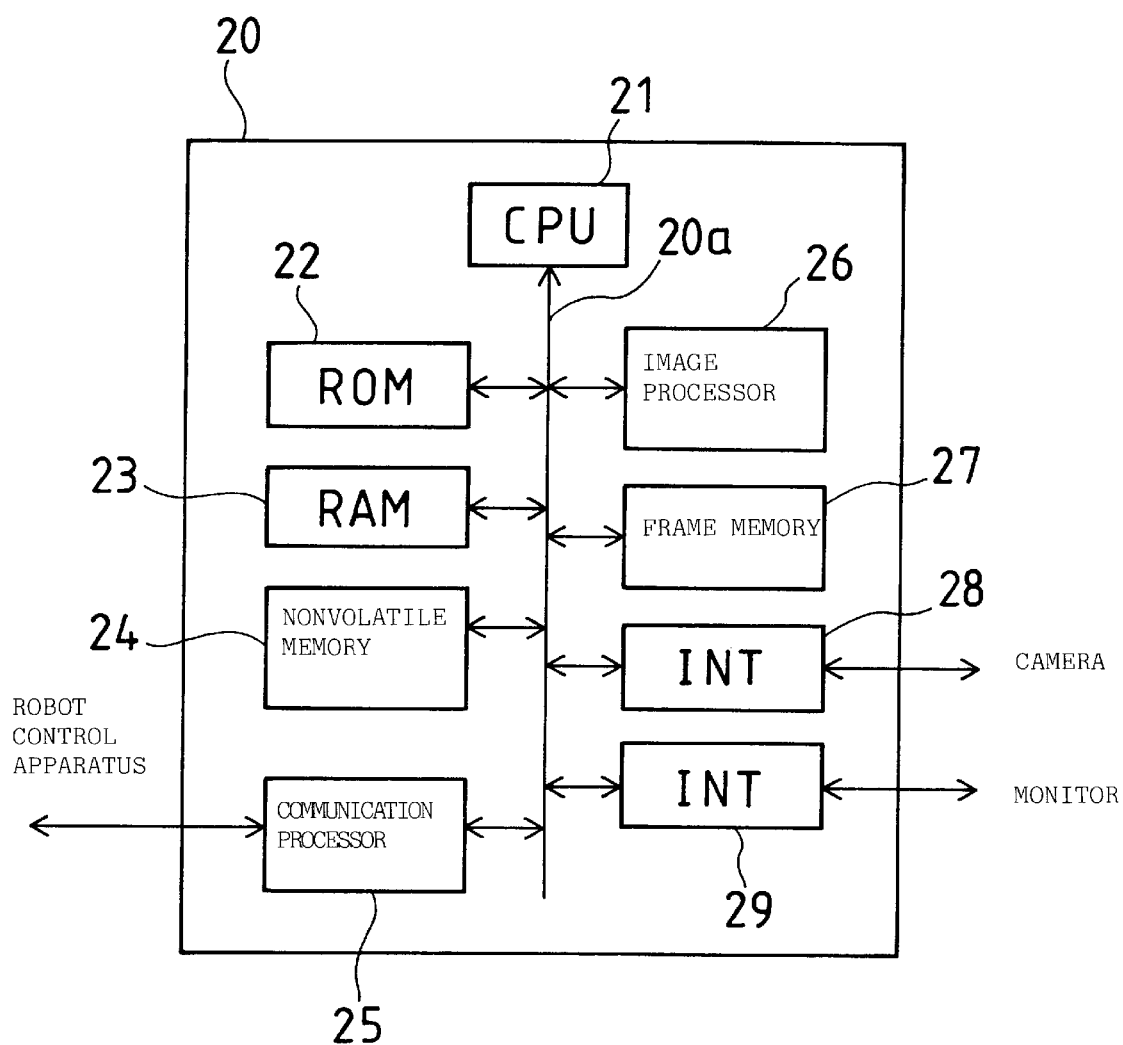
FIG. 3 is a diagram showing the hardware configuration of an image processing apparatus constituting the apparatus shown in FIG. 1.

Referring to FIG. 3, the hardware configuration of the image processing apparatus 20 will be described.

A processor 21 of the image processing apparatus 20 is connected with a ROM 22, RAM 23, nonvolatile memory 24, communication processor 25, image processor 26, frame memory 27, and interfaces (INT) 28 and 29, respectively, through a bus 20a.

The ROM 22 is loaded with a basic program for operating the image processing apparatus 20. The RAM 23 stores data for temporary processing and calculation. The nonvolatile memory 24 is composed of a CMOS or the like that is backed up by a power source, and stores data that is expected to be held even after the image processing apparatus 20 is cut off from the power supply. The data to be stored in this nonvolatile memory 24 include reference shape data of the tool 2 in the predetermined photographing position P1 (and therefore, the reference shape data storage means 7 shown in FIG. 1 coerresponds specifically to the nonvolatile memory 24 in the image processing apparatus 20 of FIG. 4). The reference shape data are based on the parameters, namely, the three-dimensional lengths and angles of a distal end portion 2a of the tool 2 fixed in a given direction at the prredetermined photographing position P1 as viewed from the cameras 41 and 42.

The communication processor 25 delivers to and receives data from the robot control apparatus 30 through a communication line. The image processor 26 reads the image data picked up by the cameras 41 and 42 through the interface (INT) 28, temporarily loads them into the frame memory 27, and carries out profiling and other operations of the image data in the frame memory 27. Data such as the photographing conditions of the cameras 41 and 42 and the state of operation are fed to a monitor (not shown) through the interface (INT) 29, and displayed on the monitor.

The processor 21 detects the shape of the tool 2 in terms of the three-dimensional lengths and angles thereof on the basis of the profiled image data, compares it with the reference shape data in the nonvolatile memory 24, and computes the error value. The computed error value is fed to the robot control apparatus 30 through the communication processor 25. Also, the processor 21 determines whether or not the error value is within a preset allowable range, and informs the robot control apparatus 30 of the result.

Figure 4:
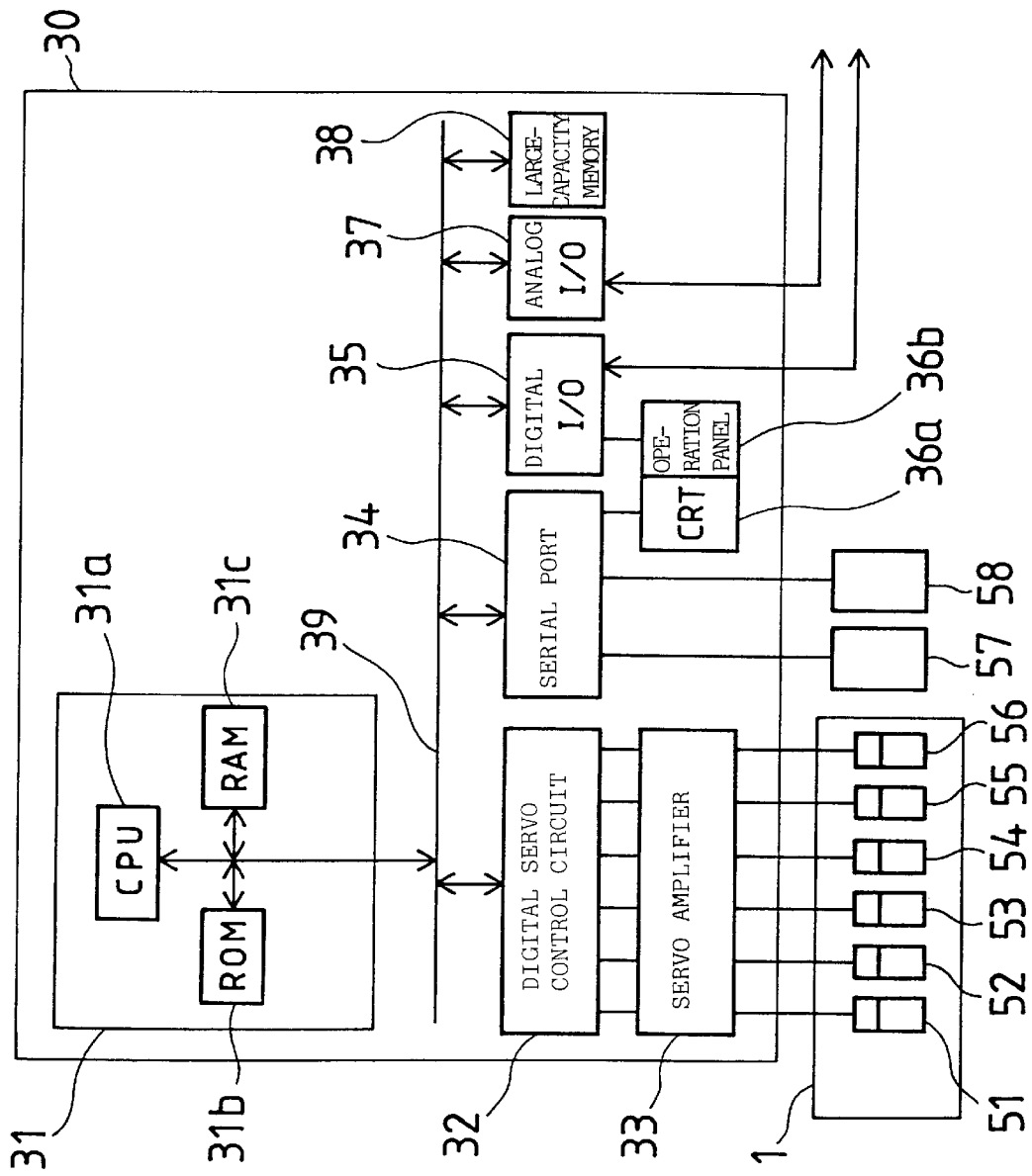
FIG. 4 is a diagram showing the hardware configuration of a robot control apparatus constituting the apparatus shown in FIG. 1.

Referring to FIG. 4, the hardware configuration of the robot control apparatus 30 will be described.

The robot control apparatus 30 is provided with a processor board 31. A processor 31a of the processor board 31 is connected with a ROM 31b and a RAM 31c through a bus 39. The processor 31a controls the whole robot control apparatus 30 in accordance with system programs stored in the ROM 31b. The RAM 31c is loaded with various data and also with operation programs for the robot 1 and correction programs for the taught path, which will be mentioned later. Part of the RAM 31c is formed as a nonvolatile memory, and the operation programs or correction programs are stored in this nonvolatile memory portion.

Further, the bus 39 is connected with a digital servo control circuit 32, serial port 34, digital I/O 35, analog I/O 37, and large-capacity memory 38.

The digital servo control circuit 32 drives servomotors 51, 52, 53, 54, 55 and 56 through a servo amplifier in accordance with commands from the CPU 31a of the processor board a 31. These servo motors 51 to 56 are built in the robot 1, and operate individual axes of the robot 1.

The serial port 34 is connected to a teaching control panel 57 with display and other external apparatuses 58, which are connected through RS232C. This serial port 34 is connected to the image processing apparatus 20 (i.e., those external apparatuses 58 include the image processing apparatus 20). The teaching control panel 57 with display is used to input the taught path of the tool 2 and the like. Moreover, the serial port is connected to a CRT 36a, which displays a coordinate position, control screen, etc. A console panel 36b is connected to the digital I/O 35. The analog I/O 37 is connected to a power supply unit of a laser apparatus, and welding voltage is instructed through the analog I/O 37. The large-capacity memory 38 is loaded with taught data and related information.

Referring now to the flowcharts of FIGS. 5 and 6, procedures to be executed by the image processing apparatus 20 and the robot control apparatus 30 having the above hardware configuration and constituting the correcting apparatus for the robot movement path will be described.

Referring first to the flowchart of FIG. 5, the procedures of processing by the CPU 21 of the image processing apparatus 20 will be described.

This processing is started upon receiving the information from the robot control apparatus 30 to the effect that the robot 1 is moved by the robot control apparatus 30 so that the tool 2, the object of photographing, is moved to the predetermined photographing position P1.

When the processing is started, the CPU 21 first outputs a command for photographing to the first camera. 41, reads XZ-plane image data of the photographed tool 2 through the interface 27, and temporarily stores the data into the frame memory 27 (Step S1). Then, the CPU 21 delivers a command requiring the detection of the object to the image processor 26. In response to this command, the image processor 26 makes the image data to undergo profiling, and measures the shape of the tool 2 (i.e., the length, angle, and position of the tool 2) projected on the XZ-plane (Step S2).

Likewise, YZ-plane image data of the tool 2 picked up by the second camera 2 are read through the interface 27 and temporarily loaded into the frame memo 27 (Step S3). Then, the image data are made to undergo profiling and the like, and the shape of the tool 2 projected on the YZ-plane is measured (Step S4).

Thereupon, three-dimensional shape data in the XYZ coordinate space of the tool 2 is obtained from the shape of the tool 2 on the XZ-plane obtained in Step S2 and the shape of the tool 2 on the YZ-plane obtained in Step S4 (Step S5). Then, the reference three-dimensional shape data of the tool 2 is fetched from the nonvolatile memory 24, and are compared with the three-dimensional shape data of the tool 2 obtained in Step S6, whereupon errors or deviations from the reference values of the three-dimensional shape data of the tool 2, currently attached to the robot, are obtained (Step S6).

Then, it is determined whether or not the obtained errors are within the allowable range (Step S7). If the errors are concluded to be within the allowable range, information to that effect is transmitted to the robot control apparatus 30 (Step S9) to terminate the processing. If the obtained errors are determined to be out of the allowable range, that error data and information to the effect are delivered to the robot control apparatus 30 (Step S8) to terminate this processing.

Referring now to the flowchart of FIG. 6, the procedures of processing by the CPU 31 of the robot control apparatus 30 will be described. This process is executed every time one stage of the main operation by the robot 1 is finished (i.e., before the next main operation is started).

The robot 1 is controlled so that the tool 2, the object of photographing, is moved to a predetermined photographing position P1 (Step T1). When the tool 2 has reached the photographing position P1 information to that effect is transmitted to the image processing apparatus 20. On receiving this signal, the image processing apparatus 20 starts processing according to the flowchart of FIG. 5.

Figure 5:
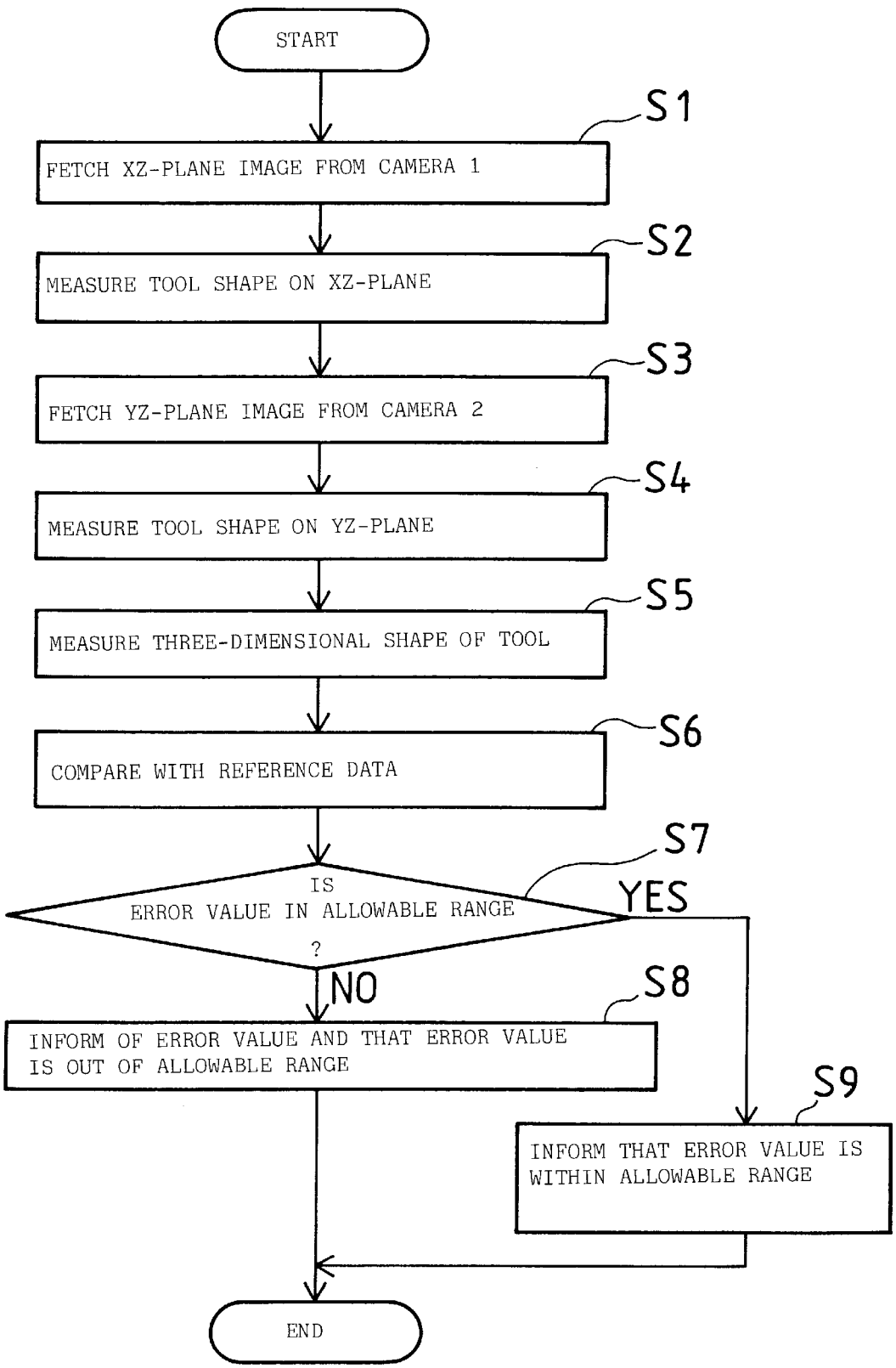
FIG. 5 is a flowchart showing processing in the image processing apparatus of FIG. 3.
Figure 6:
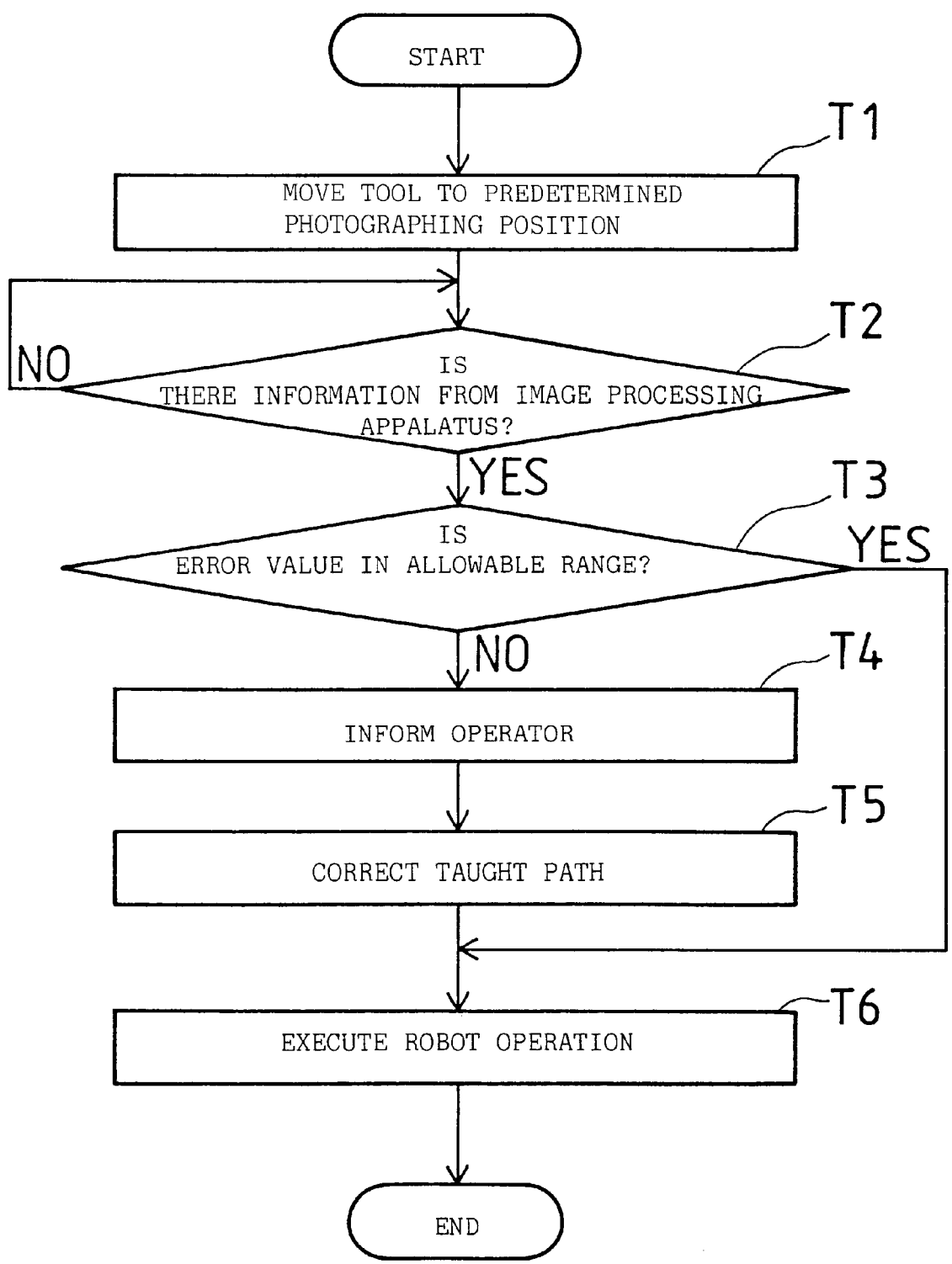
FIG. 6 is a flowchart showing processing in the robot control apparatus of FIG. 4.

After the tool 2 has moved to the photographing position P1, it is kept on standby (Step T2) until the information to the effect that the errors are within the allowable range or the information to the effect that the errors are out of the allowable range is received from the image processing apparatus 20 (see Steps S9 and S8 of FIG. 5). When the information to the effect that the errors are within the allowable range is received from the image processing apparatus 20, execution of the main operation is started in accordance with the path taught by the program (Step T6);

On the other hand, when the information to the effect that the errors are out of the allowable range and the relevant error data is received from the image processing apparatus 20, an operator is informed of the fact that the taught movement path must be corrected due to deformation of the tool through display on the CRT 36a or the like (Step T4), and the program-taught path of the tool 2 is then corrected on the basis of the delivered error data (Step T5). Execution of the main operation is started by actuating the robot in accordance with the corrected taught path (Step T6).

Thus, in the present embodiment, the shape of the tool 2 is measured based on the images of the tool 2 picked up by the cameras 41 and 42, and the taught path is corrected on the basis of the differences between the measured shape and the reference shape data. Thus, even when the operator is not on the site of operation, the deformation of the tool 2 can be detected, and the path can be automatically corrected depending on the extent of the deformation. Thus, the machining line need not be stopped in order to execute the path correction to cope with the deformation of the tool, so that the manufacturing efficiency is improved, and normal operation can be carried out at all times. Moreover, since the operator need not enter the job site for the correction, safety can also be maintained.

Furthermore, in the case of the present embodiment, it is designed so that the taught path is corrected when the deformation of the tool goes beyond the allowable range; however, this embodiment may be arranged so that the tool can be replaced after stopping the operation of the robot 1, when the deformation of the tool is too much beyond the allowable range.

What is claimed is:

1. An apparatus for correcting a movement path of a robot, comprising:
    a camera photographing a tool mounted on a wrist end of the robot, the robot operable in three dimensions;
    an image processing apparatus obtaining shape data of the tool by processing images of said tool photographed by said camera and determining an extent of deformation of the tool by comparing the shape data with previously stored reference shape data; and
    a robot control apparatus correcting deviation from a taught path of the robot based upon the extent of deformation of the tool determined in accordance with the shape data of the tool obtained by said image processing apparatus and controlling the robot to move along a corrected taught path, wherein the shape of the tool is recognized before starting operation by the robot and the deviation from the taught path attributable to the deformation of the tool is automatically corrected.

2. An apparatus for correcting movement path of a robot according to claim 1, wherein said robot control apparatus controls the robot to move the tool to a predetermined photographing position and transmit information indicating that said photographing position is reached by the tool to said image processing apparatus, while said image processing apparatus commands the camera to photograph said tool on receiving the information from the robot.

3. An apparatus for correcting movement path of a robot according to claim 1, wherein said image processing apparatus obtains three-dimensional shape data of the tool by receiving an image of one side face of the tool photographed by the camera and an image of another side face of the same tool perpendicular to the one side face.

4. An apparatus for correcting movement path of a robot according to claim 1, wherein said taught path is corrected in accordance with the shape data of the tool obtained by said image processing apparatus only when a difference between the tool shape and a reference tool shape obtained as a result of comparison thereof is not smaller than a predetermined value.

5. An apparatus for correcting movement path of a robot according to claim 1, wherein said image processing apparatus includes:
    a tool shape recognizing device recognizing a shape of the tool from the images photographed by the camera,
    a reference shape data storage device storing reference shape data of said tool, and
    an error value computing device computing error values between the tool shape recognized by said tool shape recognizing device and the reference shape data stored in said reference shape data storage device.

6. A movement path correcting method for a robot, comprising:
    locating a tool mounted on a wrist end of the robot and a camera for photographing said tool in predetermined relative positions, the robot operable in three dimensions;
    fetching and processing images through the camera to obtain shape data of the tool from the processed image data;
    comparing the obtained tool shape data with previously stored reference tool shape data to detect an extent of deformation of the tool; and
    correcting a deviation from a path of the robot taught by a program in accordance with the result of the detection, wherein the shape of the tool is recognized before starting operation by the robot and the deviation from the taught path attributable to the extent of the deformation of the tool is automatically corrected.

7. A movement path correcting method for a robot according to claim 6, wherein said camera is placed in a fixed position, and said robot is controlled so that the tool is brought to a photographing position for the camera.

8. A movement path correcting method for a robot according to claim 6, wherein said camera photographs the front and side faces of the tool to obtain three-dimensional shape data of the tool from the two image data.

* * * * *